United States Patent [19]

Holmes

[11] 4,374,636

[45] Feb. 22, 1983

[54] APPARATUS FOR PRODUCING CENTRALLY APERTURED RECORD DISCS

[75] Inventor: John R. Holmes, Garden Grove, Calif.

[73] Assignee: Discovision Associates, Costa Mesa, Calif.

[21] Appl. No.: 368,791

[22] Filed: Apr. 15, 1982

Related U.S. Application Data

[63] Continuation of Ser. No. 263,435, May 14, 1981, abandoned, which is a continuation of Ser. No. 31,205, Apr. 18, 1979, abandoned.

[51] Int. Cl.³ .................. B29D 17/00; B29F 1/06; B29F 1/08; B29F 1/14
[52] U.S. Cl. ..................... 425/589; 425/810; 425/812; 425/DIG. 44; 249/67
[58] Field of Search ............ 425/589, 810, 812, 580, 425/DIG. 44; 249/67, 68, 205; 264/298

[56] References Cited

U.S. PATENT DOCUMENTS

| | | | |
|---|---|---|---|
| 1,915,357 | 6/1933 | Fernberg | 425/810 |
| 2,030,726 | 2/1936 | Strock et al. | 249/68 |
| 2,587,070 | 2/1952 | Spillman | 249/68 X |
| 2,613,395 | 10/1952 | Massler | 425/810 |
| 2,976,571 | 3/1961 | Moslo | 425/812 |
| 2,992,455 | 7/1961 | Salzman | 425/810 |
| 3,154,816 | 11/1964 | Harrison et al. | 425/DIG. 44 |
| 3,397,425 | 8/1968 | Phillipson et al. | 425/810 |
| 3,442,990 | 5/1969 | Phillipson et al. | 425/810 |
| 3,897,929 | 8/1975 | Hartman | 249/167 X |
| 3,969,057 | 7/1976 | Pierre | 425/810 |
| 3,986,805 | 10/1976 | Haines | 249/68 X |
| 4,085,178 | 4/1978 | McNeeley et al. | |
| 4,185,955 | 1/1980 | Holmes et al. | 425/810 |
| 4,198,037 | 4/1980 | Anderson | 264/248 X |
| 4,260,360 | 4/1981 | Holmes et al. | 425/810 |

FOREIGN PATENT DOCUMENTS

| | | | |
|---|---|---|---|
| 778318 | 2/1968 | Canada | 425/810 |
| 700886 | 9/1970 | Netherlands | 425/810 |

*Primary Examiner*—J. Howard Flint, Jr.
*Attorney, Agent, or Firm*—Ronald J. Clark

[57] ABSTRACT

An injection molding apparatus for use in producing centrally-apertured video disc records. The apparatus includes first and second mold halves reciprocally movable with respect to each other between a closed position, wherein the two mold halves are in proximity to each other and molten plastic material is injected into a planar, annular cavity defined therebetween to form the record disc, and an open position, wherein the two mold halves are spaced apart from each other and the molded record disc can be removed. The molding apparatus further includes first and second annular rings carried by the respective first and second mold halves and defining the outer perimeter of the cavity. Each ring has an abutment face for compressive engagement with the abutment face of the other ring, when the apparatus is in the closed position, and one of the rings includes a plurality of spaced, radially-aligned grooves in its abutment face, defining ports for venting air from the cavity when the molten material is injected therein. The first mold half includes two plates reciprocally movable with respect to each other, with a plurality of compression springs in the form of polyurethane blocks interposed between the two plates, to bias the two annular rings into compressive engagement with each other when a central aperture is being punched in the molded record disc. When the apparatus is in the closed position, the two mold halves are aligned with respect to each other by a plurality of frusto-conical posts mounted on one mold half and conformably received by corresponding recesses formed on the other mold half, such posts and recesses not being subject to wear from sliding friction when the apparatus is moved, reciprocally, between the closed and open positions.

5 Claims, 8 Drawing Figures

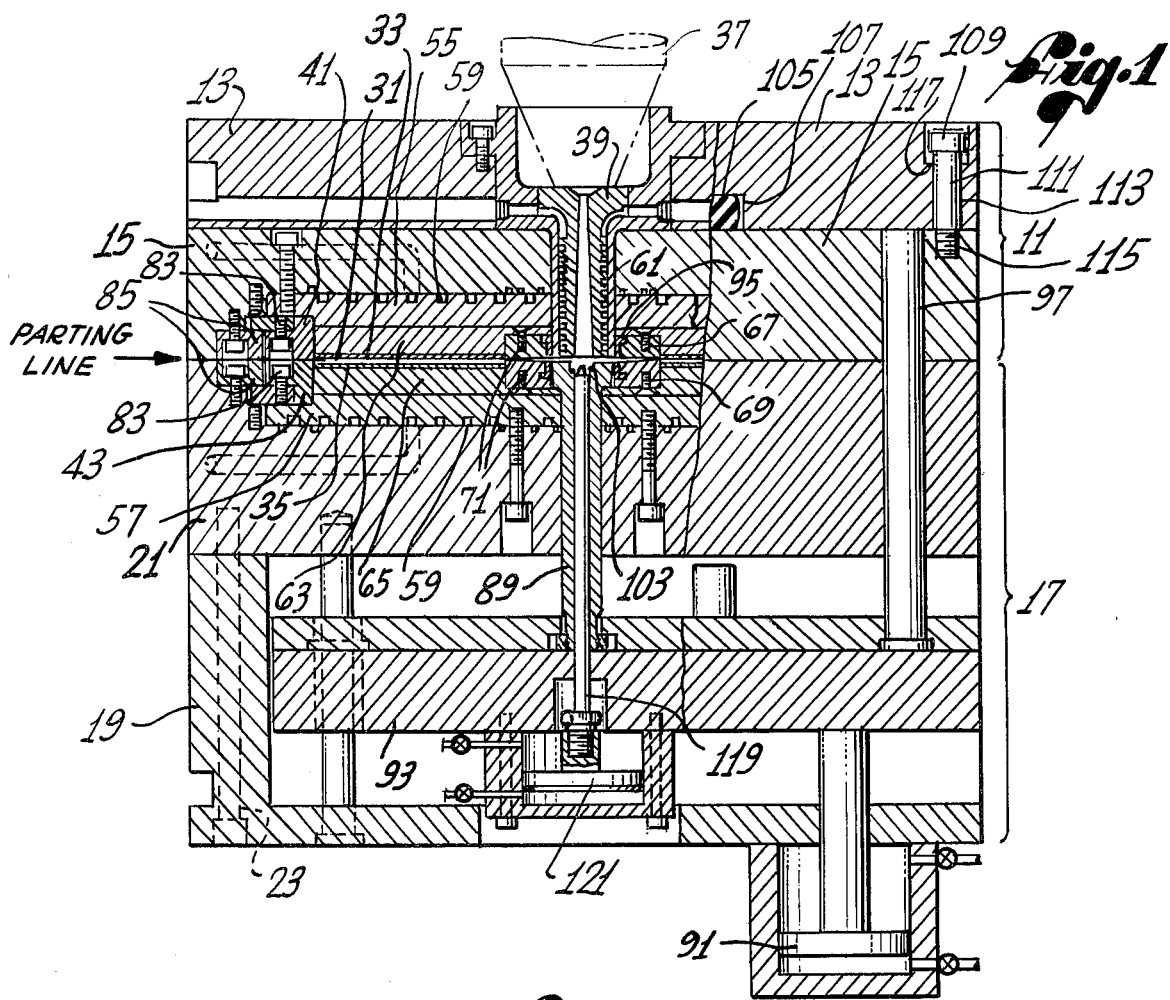
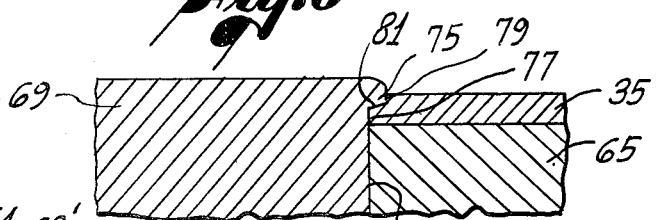
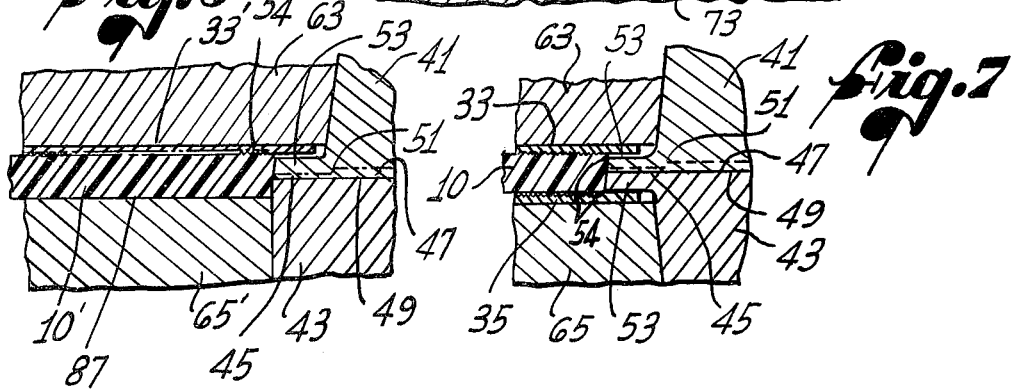

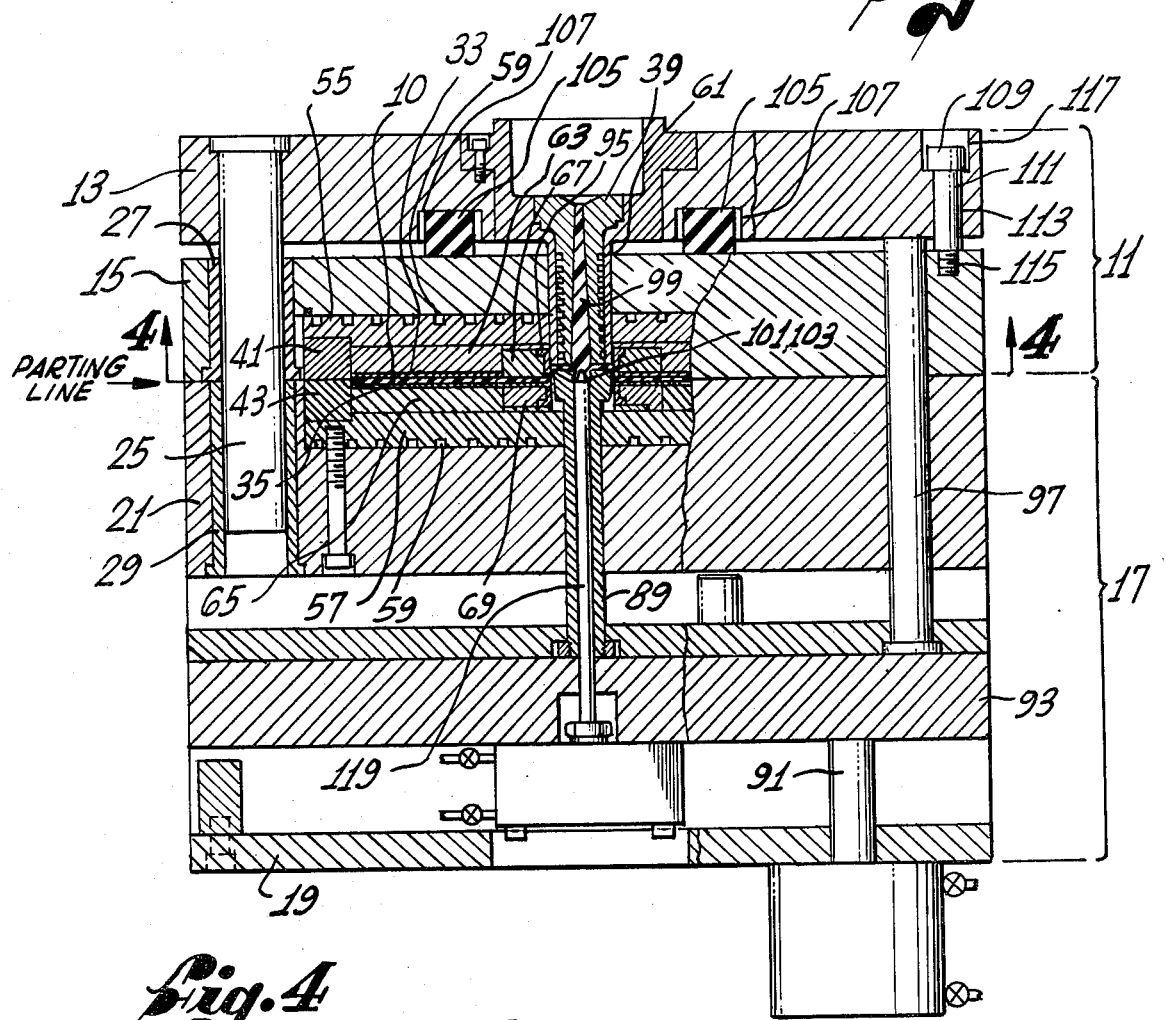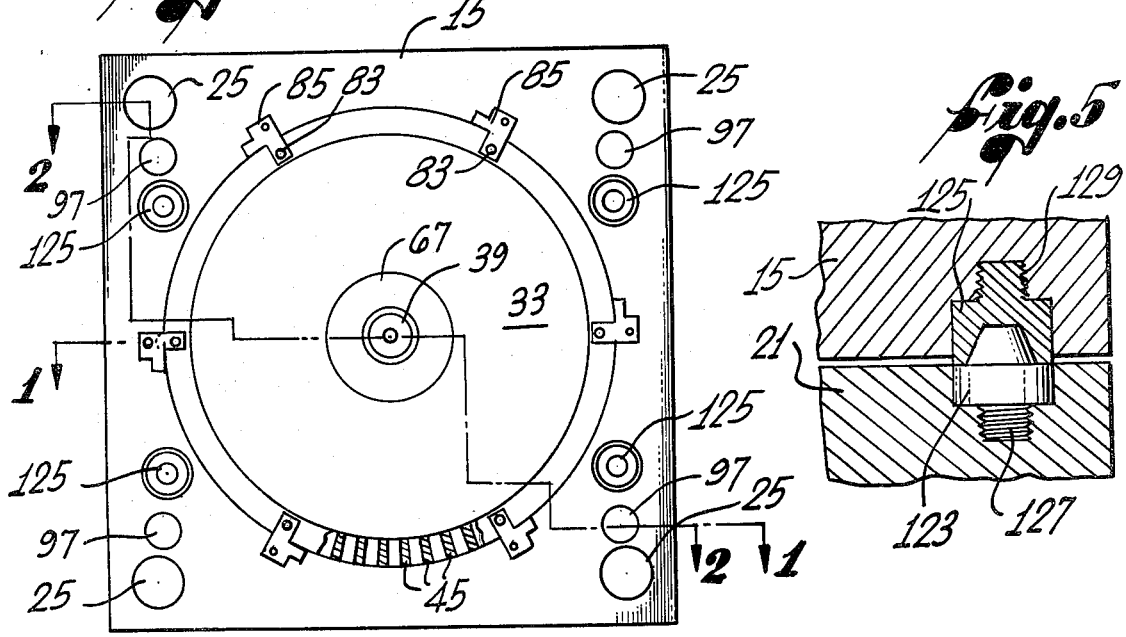

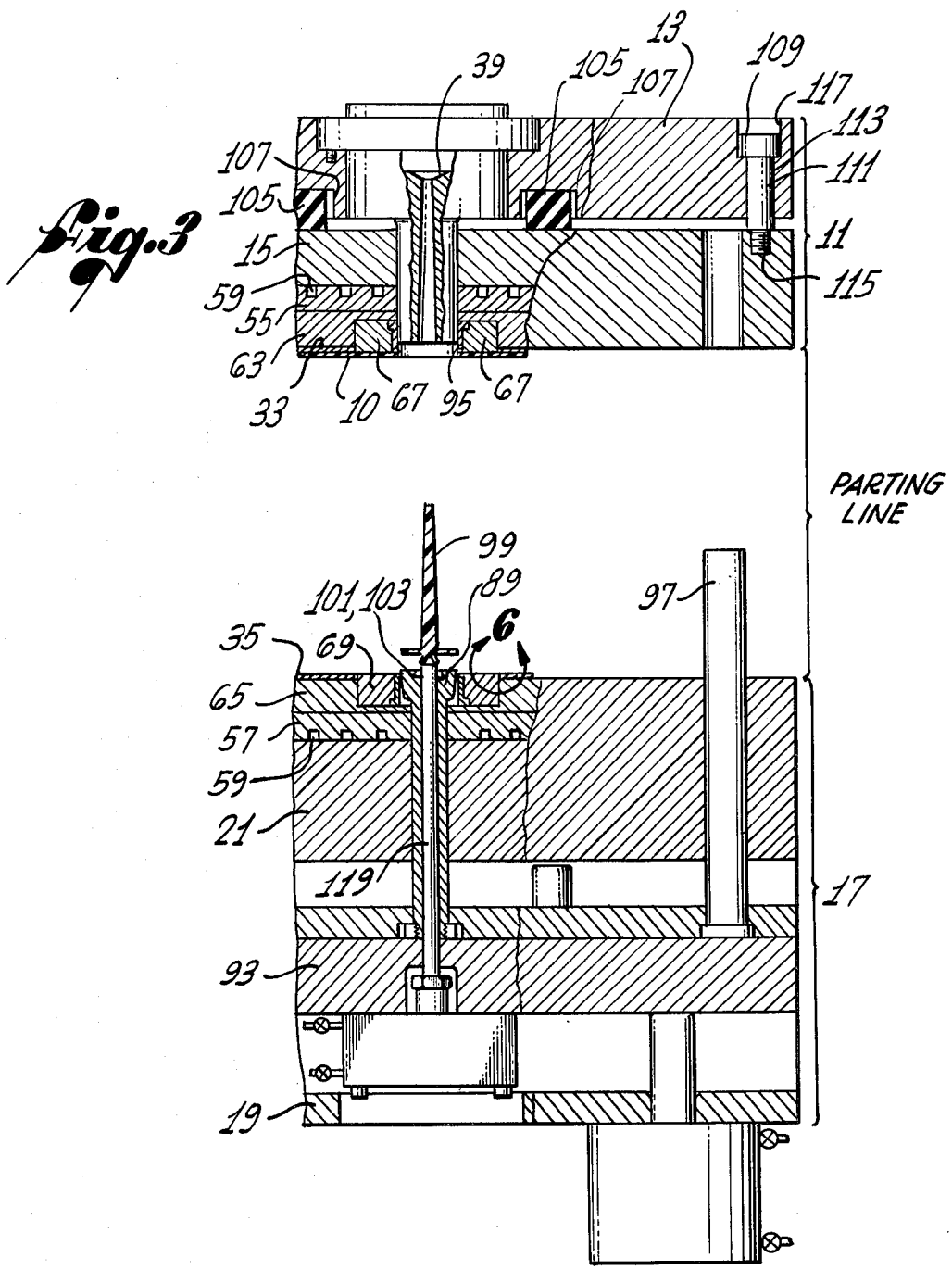

APPARATUS FOR PRODUCING CENTRALLY APERTURED RECORD DISCS

CROSS REFERENCE TO RELATED APPLICATIONS

This is a continuation of U.S. patent application Ser. No. 263,435, filed May 14, 1981, which was a continuation of U.S. patent application Ser. No. 031,205, filed Apr. 18, 1979, both of which are abandoned.

BACKGROUND OF THE INVENTION

This invention relates generally to molding apparatus and, more particularly, to injection molding apparatus for producing centrally apertured record discs, such as video discs.

An example of a molding apparatus of this particular type is disclosed in commonly assigned U.S. Pat. Nos. 4,185,955 and 4,260,360 filed in the name of J. R. Holmes et al, and entitled "Method and Means for Replicating Centrally Apertured Video Disc Records". The apparatus described in that application is used in an injection molding machine and includes first and second mold halves reciprocally movable between a closed position, wherein molten disc material is injected into an annular cavity to form a video disc, and an open position, wherein the parting line, which passes through the cavity, is opened and the molded video disc can be removed from the apparatus. The annular cavity is defined by a pair of planar, disc-shaped stampers secured to platens on the respective mold halves.

After the injected disc material has cured, the molding machine begins moving the two mold halves from the closed position to the open position. A special latch lock mechanism in the apparatus holds the parting line initially closed, causing initial movement apart to occur between two plates on the first mold half. When the two plates have moved apart by a prescribed amount, the central aperture is punched in the molded video disc, after which time the latch lock mechanism permits the parting line to open and the video disc to be extracted.

Each stamper has a central opening and is secured at its inner periphery by a special center clamp and at its outer periphery by a special outer ring clamp. When molten material is injected into the cavity, air is vented through a narrow gap between the stamper for the second mold half and a radially inwardly projecting annular foot that is integral with the outer ring clamp for the first mold half. Although this arrangement is generally satisfactory in most situations, variations in stamper thicknesses can affect the size of the vent passage, thereby resulting in an undesired variation in the back pressure afforded by the venting air.

Another drawback to the molding apparatus described in the aforementioned patent application arises from the fact that the stampers can be replaced only by a delicate insertion procedure at the site of the apparatus. Because of a difficulty normally encountered in accurately positioning the stampers relative to the clamps, they can sometimes be damaged by inadvertent abrasion. Still another problem arises from the fact that the apparatus includes two stampers, even though information to be molded into the disc is ordinarily carried on only one of them, the other being a blank dummy. The dummy stamper, like the stamper that carries information, is similarly subject to damage from abrasion and from dimpling, which is caused by the presence of minute foreign particles lodged between the stamper and its underlying platen.

The two mold halves are aligned with respect to each other by means of a number of guide pins located on one mold half and engagable with corresponding bushings located in the other mold half. Although generally effective in maintaining the two mold halves properly aligned, the guide pins and bushings can sometimes experience wear, to the extent that a slight misalignment of the two mold halves can occur.

Still another drawback to the aforementioned molding apparatus arises from the use of the latch lock mechanism to keep the parting line closed until the central aperture has been punched in the molded disc. The mechanism includes a rotating latching member having a pin that is engageable with corresponding recesses formed in two arms secured to the respective mold halves. The mechanism must ordinarily be periodically serviced because of a tendency to wear, and, additionally, the mechanism is believed to be somewhat more complicated than is necessary to accomplish its purpose.

It will be appreciated from the foregoing that there is a definite need for a simplified molding apparatus that can be used to produce video discs, without being too susceptible to wear and damage from abrasion, and wihtout undue reliance on precise tolerances for proper operation. The present invention fulfills this need.

SUMMARY OF THE INVENTION

The present invention is embodied in an improved molding apparatus for use in a reciprocating injection molding machine to produce centrally apertured record discs, such as video discs. The apparatus includes first and second mold halves that are reciprocally movable with respect to each other between a closed position, wherein molten material is injected into a disc-shaped annular cavity to form a molded disc, and an open position, wherein the parting line of the apparatus, which passes through the cavity, is opened and the disc can be extracted. At least one surface of the annular cavity is defined by a planar, disc-shaped stamper mounted on one of the two mold halves.

The closed position of the apparatus is defined by an abutment between first and second annular rings carried on the first and second mold halves, respectively. In accordance with one aspect of the present invention, the inner peripheries of the first and second rings define the outer perimeter of the annular cavity, and the rings include means defining a plurality of ports for venting air from the annular cavity whenever molten material is injected into it. Further, the sizes of the ports are not dependent on the relative thickness of the stamper, and a predetermined back pressure for the injected material can be maintained.

More particularly, each of the annular rings includes a planar abutment face for engagement with other, and the vent ports are defined by a plurality of spaced radial channels formed in the abutment face of at least one of the two rings. Additionally, the inner peripheries of the two rings are of substantially equal radius, and are slightly beveled to insure that the molded disc will be retained by a selected one of the two mold halves when the parting line is opened.

The inner periphery of the ring associated with the mold half on which the stamper is mounted is defined by an annular foot that projects radially inwardly to retain the outer periphery of the stamper. The foot is sized to permit the stamper to expand radially when heated by the molten material injected into the cavity.

Each of the first and second mold halves includes a disc-shaped platen having conventional cooling channels for carrying a coolant fluid to dissipate heat from the molten disc material. In accordance with another aspect of the invention, the stamper is secured not to its corresponding cooling platen, but rather, to a separate plate that is, in turn, removably secured to the platen. Thus, the delicate mounting of the stamper can be accomplished at a remote, clean location, after which the removable plate, with the stamper mounted on it, can be secured relatively easily to the cooling platen. The possibility of incurring damage to the stamper is thereby reduced significantly. Further, when only one side of the molded disc is to carry information, the apparatus includes only a single stamper, and the opposite side of the annular cavity is defined by a polished, blank surface on the removable plate. This surface can be suitably hardened and thus is substantially less susceptible to damage from abrasion and dimpling than were the conventional dummy stampers utilized in molding apparatus of the prior art.

A coarse alignment of the two mold halves with respect to each other is achieved by means of a plurality of guide pins mounted on one of the mold halves and engageable with corresponding bushings mounted on the other mold half. In accordance with another aspect of the present invention, a more precise alignment of the two mold halves is provided by special alignment means that is not subject to sliding friction when the two mold halves are moved reciprocally with respect to each other, whereby wearing of the alignment means is minimized. More particularly, the alignment means includes a plurality of frusto-conical posts projecting outwardly from one of the two mold halves, to engage corresponding recesses formed in the other mold half. In the preferred embodiment, both the plots and recesses are formed in individual elements that are threadedly received in special sockets formed in the respective mold halves.

To facilitate the punching of central apertures in the molded discs, the first mold half includes two reciprocally-movable plates, one of which includes the cooling platen and the removable plate, and the other of which is coupled to the reciprocally-movable molding machine. In operation, after the molten disc material has been injected into the annular cavity and has cured, the molding machine begins to separate the two mold halves. The apparatus includes special means for keeping the parting line closed during initial movement apart of the molding machine, causing separation of the two reciprocally-movable plates on the first mold half to occur. After the two plates have moved apart a prescribed distance, the central aperture is punched in the molded disc. Only after the aperture has been punched is the parting line permited to open and the molded disc, with the aperture properly formed in its center, removed.

In accordance with still another aspect of the present invention, the special means for keeping the parting line closed until the central aperture has been punched comprises a compression spring coupled between the two reciprocally-movable plates on the first mold half. This biases the plate that includes the cooling platen and the removable plate in compressive engagment with the second mold half, until the two plates have separated sufficiently to permit punching of the aperture. Thereafter, further movement apart of the molding machine will open the parting line and permit removal of the molded disc. The spring can advantageously be comprised of a solid polyurethane material, and is thus essentially maintenance free.

Many other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

FIG. 1 is a cross-sectional view of a molding apparatus embodying the present invention; the apparatus being shown in a closed position;

FIG. 2 is a cross-sectional view of the apparatus of FIG. 1 after being moved to an intermediate position, wherein the central aperture is punched in the molded video disc, the view being taken substantially along the line 2—2 in FIG. 4;

FIG. 3 is a partial cross-sectional view of the apparatus of FIG. 1 after being moved to an open position;

FIG. 4 is a plan view of the first mold half of the apparatus, taken substantially along the line 4—4 in FIG. 1;

FIG. 5 is a detailed cross-sectional view of a portion of the means for maintaining the first and second mold halves in alignment when the apparatus is in the closed position, the view being taken substantially along the line 5—5 in FIG. 4;

FIG. 6 is an enlarged cross-sectional view of a portion of the center clamp for securing a stamper to its underlying plate, lying within the circle 6 in FIG. 3;

FIG. 7 is an enlarged cross-sectional view of a portion of the annular rings in FIG. 1; and FIG. 8 is an enlarged cross-sectional view of a portion of the annular rings in an alternative embodiment of the invention that includes a polished dummy plate, rather than a dummy stamper.

DESCRIPTION OF THE PREFERRED EMBODIMENTS

Referring now to the drawings, and particularly to FIG. 1, there is shown a molding apparatus for use in combination with a conventional injection molding machine (not shown) to produce a centrallyapertured video disc record 10. One suitable molding machine is a 375 ton model manufactured by the Stokes Division of Penwalt Manufacturing Co. The apparatus includes a first mold half 11, having a base plate 13 and a carrier plate 15, and a second mold half 17, also having a base plate 19 and a carrier plate 21.

The two plates 13 and 15 of the first mold half 11 are reciprocably movable with respect to each other between a closed position (FIG. 1), wherein they are in abutment, and an intermediate or punch position (FIG. 2), wherein they are spaced apart from each other by a prescribed amount. The two plates 19 and 21 of the second mold half 17, on the other hand, are rigidly coupled to each other by means of a plurality of circumferentially-spaced bolts, one of which is shown in phantom lines at 23. A coarse alignment between the two mold halves is achieved by means of a plurality of guide pins 25 (FIG. 2), which are fixed to the base plate 13 of the first mold half 11, and which are slidably received in bushings 27 and 29 in the carrier plates 15 and 21 of the first and second mold halves 11 and 17, respectively.

The base plates 13 and 19 on the two mold halves 11 and 17, respectively, are secured to separate, reciprocating parts on the standard injection molding machine (not shown). The molding machine operates to move the two mold halves, in succession, from the closed position (FIG. 1), wherein they are in abutment and a molten plastic material is injected into an annular cavity 31 formed between them, to the intermediate or punch position (FIG. 2), wherein a central aperture is punched in the molded video disc 10, and, in turn, to the open position (FIG. 3), wherein the parting line between the two mold halves is opened and the molded disc can be removed. The annular cavity 31 between the two mold halves 11 and 17 is defined by first and second disc-shaped stampers 33 and 35, which are removably coupled to the carrier plate 15 of the first mold half and the carrier plate 21 of the second mold half, respectively. The molten material is injected into the cavity through a nozzle 37, which is a part of the molding machine, and a sprue bushing 39 mounted on the first mold half base plate 13.

As shown in FIG. 1, the closed position of the molding apparatus is determined by a compressive abutment between a first annular ring 41 and a second annular ring 43, which are carried on the first and second mold halves 11 and 17, respectively. In accordance with one aspect of the present invention, the inner peripheries of the first and second rings define the outer perimeter of the annular cavity 31, and the rings include means defining a plurality of ports 45 for venting air from the annular cavity whenever molten plastic material is injected into it through the sprue bushing 39. The cross-sectional size of each port is fixed, so a predetermined back pressure for regulating the flow of the injected material can be maintained, regardless of variations in the relative thicknesses of either of the two stampers 33 and 35. This insures that the injected material will move radially outwardly within the cavity at a prescribed rate.

More particularly, and as shown in FIGS. 4 and 7, the first annular ring 41 includes a planar abutment face 47 for engagement with a corresponding abutment face 49 on the second annular ring 43, and the vent ports 45 are defined by a plurality of spaced radial channels formed in the abutment face of at least one of the two rings, herein the first ring. The cross-sectional size of each vent port enlarges, a prescribed distance from the inner periphery of the rings, as indicated by reference numeral 51. Additionally, the inner peripheries of the two annular rings are of substantially equal radius, and are beveled by approximately 10°, to insure that the molded disc 10 will be retained by a selected one of the two mold halves, herein the first mold half 11, when the parting line of the apparatus is opened.

As shown in FIG. 7, the two annular rings 41 and 43 are substantially identical in shape, except for the vent ports 45 and the bevel of their inner peripheries. The inner periphery of each ring is defined by an annular foot 53 that projects radially inwardly to retain the outer peripheral portion of the corresponding stamper 33 or 35. As indicated in exaggerated scale at 54, the feet are spaced slightly above their underlying stampers, to permit the stampers to expand radially, without undue friction, when heated by the molten plastic material injected into the cavity 31. The molten material is normally sufficiently viscous, especially after it has contacted the relatively cool stampers, that it does not travel any significant distance into any of the vent ports 45 or into the narrow space 54 between a ring and its underlying stamper.

The two carrier plates 15 and 21 include disc-shaped platens 55 and 57, respectively, having spiral cooling channels 59 for carrying a coolant fluid (not shown), to dissipate heat from the molten plastic material injected into the annular cavity 31. These cooling channels 59, along with a helical cooling channel 61 for the sprue bushing 39, are described in greater detail in the aforementioned U.S. Pat. Nos. 4,185,955 and 4,260,360.

In accordance with another aspect of the invention, the stampers 33 and 35 are secured not to their corresponding cooling platens 55 and 57, but, rather, to separate plates 63 and 65 that are, in turn, removably secured to the respective platens. Thus, the delicate procedure of mounting the stamper can be accomplished at a remote, clean location, after which the removable plate, with the stamper mounted thereon, can be secured relatively quickly and easily to its corresponding cooling platen. The likelihood of damaging the stamper by, for example, inadvertent abrasion is thereby reduced significantly.

As shown in FIG. 1, the two stampers 33 and 35 are clamped to their corresponding removable plates 63 and 65 by means of special center clamps 67 and 69, respectively, which, in turn, are secured to the plates by means of a plurality of circumferentially-spaced screws, as indicated at 71. The two clamps are substantially identical, so the structures of only one of the clamps, i.e., the clamp 69 on the second mold half 17, and of the corresponding stamper 35, will be described in detail.

As shown in FIG. 6, the stamper 35 has an inner periphery that defines a central aperture, and the corresponding center clamp 69 for the stamper has a cylindrical post 73 that projects upwardly through the aperture, with an annular finger 75 projecting radially outwardly from the top of the post to conformably engage a corresponding beveled recess formed in the inner periphery of the stamper.

More specifically, the inner periphery of the stamper 35 preferably includes a lower, vertical wall 77 for conforming engagement with the post portion 73 of the clamp 69, an upper wall 79 for conforming engagement with the outer periphery of the annular finger 75 of the clamp, and an intermediate beveled portion 81 for conforming engagement with a corresponding bevel on the underside of the finger 75. This special conforming arrangement permits the stamper to be quickly and easily mounted, and ensures substantial concentricity of the stamper relative to the clamp. The inner periphery of the stamper can be conveniently formed in the stamper using a conventional punching apparatus.

As shown in FIG. 7, the radially inwardly projecting annular foot 53 in each of the annular rings 41 and 43 functions to retain the outer periphery of the corresponding stamper 33 or 35, ensuring that the stamper will remain planar and that the annular cavity 31 will have a prescribed thickness over its entire radius. Each ring is secured to its corresponding removable plate by means of a plurality of circumferentially-spaced screws 83. With their particular center clamps and annular rings in place, the removable plates 63 and 65 can be secured relatively quickly to their corresponding cooling platens 55 and 57 by means of a plurality of locking tabs 85 (FIGS. 1 and 4).

In an alternative embodiment of the present invention, the annular ring portion of which is shown in FIG. 8, the molding apparatus includes only a single stamper 33', located on the first mold half 11' and the video discs 10' produced by the apparatus bear information on only one of their sides. In this embodiment, one side of the annular cavity 31' is defined by the stamper, and the other side is defined by the outer surface 87' of the removable plate 65' on the second mold half 17'. This surface can be suitably hardened and polished, and is thus substantially less susceptible to damage from abrasion than were conventional dummy stampers utilized in prior molding apparatus for producing discs bearing information on only one side. Additionally, the possibility of dimpling due to foreign particles being lodged under such dummy stampers is completely avoided. The annular ring 43' for the second mold half can be substantially cylindrical and need not include the radially inwardly projecting annular foot, which is ordinarily needed only to retain the outer periphery of a stamper.

FIGS. 1, 2, and 3 depict the sequence of operation of the molding apparatus. FIG. 1 depicts the apparatus in the closed position, with the base plate 13 and the carrier plate 15 of the first mold half 11 in compressive abutment, and with the annular rings 41 and 43 of the respective first and second mold halves 11 and 17 also in compressive abutment. When in this closed position, the molten plastic disc material is injected into the annular cavity 31 between the two mold halves, to form the molded video disc 10. FIG. 2 depicts the apparatus after it has moved to the intermediate or punch position, with the two annular rings still in abutment, but with the base plate and carrier plate of the first mold half separated by a prescribed amount. A central aperture is punched in the molded video disc when the apparatus is in this intermediate position. FIG. 3 depicts the apparatus after it has moved to the open position, with the parting line between the two mold halves opened and the centrally-apertured molded disc in position to be removed.

The molding apparatus is moved sequentially from the closed position (FIG. 1) to the intermediate or punching position (FIG. 2), and, in turn, to the open position (FIG. 3) by the molding machine (not shown), which is coupled to the apparatus through the base plates 13 and 19 of the first and second mold halves 11 and 17, respectively. The machine functions to move the two base plates away from each other and toward each other in a reciprocal fashion, each complete cycle resulting in the formation of a separate video disc 10.

Initial movement apart of the two base plates 13 and 19 takes place only after the injected plastic material has cured. For reasons that will be discussed subsequently, this initial movement causes a separation of the base plate 13 and carrier plate 15 of the first mold half 11, while the parting line, which passes through the annular cavity 31, remains closed. This separation operates to move the sprue bushing 39, which is secured to the first mold half base plate 13, away from the molded disc 10, producing a gap therebetween. After these two plates have moved apart by a prescribed amount, a punch 89 is thrust upwardly through the molded disc 10 and into the gap between the disc and the sprue bushing by means of an air cylinder piston 91 that is coupled to the punch by means of a reciprocably-movable punch plate assembly 93. The upwardly moving punch cooperates with a hardened die element 95 secured to the center clamp 67 of the first mold half 11 to form the central aperture in the molded disc.

Upward movement of the punch plate assembly 93 and the punch 89 is limited by a plurality of stroke limiter pins 97 that are secured to the plate assembly and that come into abutment with the underside of the base plate 13 of the first mold half 11 after the aperture has been punched. The portion of the disc 10 that is severed to form the aperture, along with an integral sprue 99, which is disposed within the sprue bushing 39, is held in place by means of an undercut 101 formed in an annular recess 103 in the top surface of the punch. A more detailed description of this punching procedure is provided in the aforementioned U.S. Pat. Nos. 4,185,955 and 4,260,360.

In accordance with another aspect of the invention, the parting line is held closed during the initial movement apart of the molding machine by means of a plurality of compression springs 105 interposed between the base plate 13 and the carrier plate 15 of the first mold half 11, whereby the carrier plate is biased in the direction of the carrier plate 21 of the second mold half 17. More particularly, the compression springs comprise solid blocks of polyurethane material disposed in recesses 107 spaced circumferentially in the base plate 13. The springs are essentially maintenance free. The uncompressed thickness of each spring is approximately one inch, but under compression, with the base plate 13 and carrier plate 15 in abutment, the thickness diminishes to approximately $\frac{3}{4}$ of an inch. The punching of the central aperture in the molded disc 10 occurs while the compression springs are still under sufficient compression to resist the force of the punch 89 and hold the parting line firmly closed.

As shown in FIGS. 1 and 2, movement apart of the base plate 13 and the carrier plate 15 of the first mold half 11 is limited by means of a plurality of bolts, one of which is shown at 109. Each bolt has a shank portion 111 that extends through a throughbore 113 in the base plate to engage a threaded bore 115 in the carrier plate. The head of the bolt is disposed in a countersunk portion 117 of the throughbore, and after the molding machine has moved the base plate and carrier plate apart by a prescribed amount, the underside of the bolt head will come into abutment with the bottom of the countersunk portion, to limit further movement apart of the two plates. Thereafter, further movement of the molding machine will operate to open the parting line of the apparatus, as shown in FIG. 3, and permit removal of the molded video disc 10.

After the apparatus has been moved into the open position (FIG. 3), the sprue 99 that has been separated from the molded disc 10 is disengaged from the undercut 101 in the punch recess 103 by means of a sprue ejector pin 119, which is actuated by an air cylinder piston 121. A more detailed description of this sprue ejection procedure is provided in the aforementioned application for U.S. patent, Ser. No. 847,367.

As shown in FIG. 2, a coarse alignment of the first and second mold halves 11 and 17 with respect to each other is achieved by means of the plurality of guide pins, one of which is shown at 25, mounted on the base plate 13 of the first mold half 11 and engageable in the bushings 27 and 29 located in the carrier plate 15 of the first mold half 11 and in the carrier plate 21 of the second mold half 17, respectively. This pin/bushing arrangement is not generally capable of maintaining a precise alignment between the two mold halves for an extended period of usage, because the repeated reciprocal motion of the two mold halves ordinarily causes at least a limited degree of wear in the pins and bushings.

In accordance with still another aspect of the invention, the molding apparatus includes additional alignment means not subject to any substantial sliding friction during the reciprocal movement of the two mold halves 11 and 17. More particularly, as shown in FIGS. 4 and 5, this alignment means includes a plurality of frusto-conical posts 123 projecting outwardly from the carrier plate 21 of the second mold half 17 to engage corresponding frusto-conical recesses 125 formed in the carrier plate 15 of the first mold half 11. Thus, each post is in contact with its corresponding recess only when the parting line is closed. It bears note that only when the parting line is closed is a precise alignment between the two mold halves of critical importance. In the preferred embodiment, both the posts and the recesses are formed in individual elements that are threadedly received in sockets 127 and 129 arranged in spaced circumferential relationship around the peripheries of the stampers 33 and 35 in the respective carrier plates 15 and 21.

It will be appreciated from the foregoing description that the present invention provides an improved molding apparatus for use in combination with a conventional injection molding machine to produce centrally-apertured video disc records. The susceptibility of the apparatus to wear in certain critical elements and to damage of its stampers from abrasion is minimized, and the back pressure of the air being vented from the annular cavity of the apparatus when molten disc material is being injected therein is maintained at a prescribed level without undue reliance on components being machined to precise tolerances.

Although the invention has been described in detail with reference to its presently preferred embodiments, it will be understood by one of ordinary skill in the art that various modifications can be made without departing from the spirit and scope of the invention. Accordingly, it is not intended that the invention be limited, except as by the appended claims.

I claim:

1. A molding apparatus for producing record discs, comprising:
    first and second mold halves reciprocally movable with respect to each other between a closed position, wherein the parting line between the two mold halves is closed and an annular cavity is formed therebetween, and wherein a molten material can be injected into the annular cavity to form a record disc, and an open position, wherein the parting line is open and the molded record disc can be removed;
    a planar, disc-shaped stamper secured to one of said first and second mold halves, said stamper defining one side of the annular cavity; and
    means for limiting the reciprocal movements of said first and second mold halves, to define said closed position, said means including
        a first annular ring fixedly secured to said first mold half, said first ring having an outwardly-facing abutment face, and
        a second annular ring fixedly secured to said second mold half, said second ring having an outwardly-facing abutment face for abutment with the abutment face of said first ring when the apparatus is in said closed position, the inner peripheries of said first and second rings defining the perimeter of said annular cavity,
    wherein the inner periphery of the annular ring for the mold half carrying said stamper is defined by an inwardly projecting annular foot that retains the outer periphery of the stamper, said annular foot being spaced from said mold half by a distance greater than the thickness of said stamper to permit the stamper to expand radially, without substantial frictional resistance, when heated by the molten material injected into the cavity,
    and wherein at least one of said first and second rings includes means for venting air from the cavity whenever molten material is being injected therein.

2. A molding apparatus as defined in claim 1, wherein:
    said means for venting air includes a plurality of circumferentially spaced, radially aligned grooves in the abutment face of the corresponding annular ring, communicating with the annular cavity; and
    the cross-sectional size of each of said plurality of radially aligned grooves increases a prescribed distance from the inner peripheries of said first and second annular rings.

3. A molding apparatus as defined in claim 1, wherein the inwardly projecting annular foot includes a planar retaining face parallel to the plane of the stamper and to the plane of the abutment faces, for slidably securing the stamper to the corresponding mold half.

4. A molding apparatus as defined in claim 1, wherein the inner periphery of the inwardly projecting annular foot is beveled, to grip the molded record disc when the apparatus is moved to the open position.

5. A molding apparatus as defined in claim 1, wherein the radial length of said annular foot is greater than the radial expansion of the stamper as it is heated for room temperature to the temperature of the molten material injected into the cavity.

* * * * *